United States Patent [19]
Moran et al.

[11] Patent Number: 5,500,935
[45] Date of Patent: Mar. 19, 1996

[54] APPARATUS AND METHOD FOR TRANSLATING GRAPHIC OBJECTS AND COMMANDS WITH DIRECT TOUCH INPUT IN A TOUCH BASED INPUT SYSTEM

[75] Inventors: Thomas P. Moran, Palo Alto; Gordon P. Kurtenbach, Mountain View, both of Calif.

[73] Assignee: Xerox Corporation, Stamford, Conn.

[21] Appl. No.: 175,846

[22] Filed: Dec. 30, 1993

[51] Int. Cl.$^6$ .............................. G06F 15/62; G06F 15/46
[52] U.S. Cl. ........................................................ 395/156
[58] Field of Search ...................................... 395/155, 161, 395/159, 156; 345/13, 15, 118

[56] References Cited

U.S. PATENT DOCUMENTS 5,276,795  1/1994  Hoeber et al. .......................... 395/156

OTHER PUBLICATIONS

"Symbolic Construction of a 2–D Scale–Space Image," IEEE Transactions on Pattern Anaysis and Machine Intelligence, Eric Saund, Aug. 1990, vol. 12, No. 8.

"Issues in Combining Marking and Direct Manipulation Techniques", Gordon Kurtenbach and William Buxton, Nov. 11–13, UIST 1991, pp. 137–144.

aha! InkWriter Quick Reference Guide and Handbook, aha! Software Corporation, 1993.

*Primary Examiner*—Phu K. Nguyen
*Attorney, Agent, or Firm*—Rosen, Dainow & Jacobs, Limited Liability Partnership

[57] ABSTRACT

A system which allows a user to implement pop-up menus and gestural marks when the input location is restricted, such as in a corner region of a display, is disclosed. In such a situation, the system translates its position from one location where space is limited to another location where space is essentially unlimited. In such restricted locations, the system provides a indicator or guide to direct the user to make the required movement of the input device to the unrestricted location. Such a guide consists of a visible path on the display from the current restricted location to the new location. The path guides the user into making the appropriate adjustment after which the user can proceed to make the appropriate menu selection or gestural mark.

22 Claims, 7 Drawing Sheets

APPARATUS AND METHOD FOR TRANSLATING GRAPHIC OBJECTS AND COMMANDS WITH DIRECT TOUCH INPUT IN A TOUCH BASED INPUT SYSTEM

RELATED APPLICATION

This application is related to Ser. No. 07/869,554, filed Apr. 15, 1992, (attorney docket XRX-118), Ser. No. 07/868,559, filed Apr. 15, 1992 (attorney docket XRX-119), Ser. No. 08/101,646, filed Aug. 4, 1993, (attorney docket XRX-136), Ser. No. 08/101,645, filed Aug. 4, 1993 (attorney docket XRX-137), Ser. No. 08/136,360, filed Oct. 14, 1993, entitled Apparatus and Method for Generating Place-holders in a Touch Based Input System (attorney docket XRX-138), Ser. No. 08/175,853, filed Dec. 30, 1993, (attorney docket number XRX-144) entitled Apparatus and Method for Executing Multiple Concatenated Command Gestures in a Gesture Based Input System, Ser. No. 08/175,850, filed Dec. 30, 1993, (attorney docket XRX-146), entitled Method and Apparatus For Correcting and/or Aborting Command Gestures In a Touch Based Input System, Ser. No. 08/175,841, filed Dec. 30, 1993, (attorney docket XRX-150) entitled Apparatus and Method for Altering Enclosure Selections In a Gesture Based Input System, and Ser. No. 08/176,150, filed Dec. 30, 1993, (attorney docket XRX-149) entitled Apparatus and Method for Supporting the Implicit Structure of Freeform Lists, Outlines, Text, Tables, and Diagrams in a Gesture-Based Input System and Editing System, all assigned to the present assignee, the disclosures of which are in their entirety, each specifically incorporated by reference herein.

FIELD OF THE INVENTION

This invention pertains to an information input system and method and more particularly to a "gesture based" graphical input system that receives information by sensing the motion of a stylus, pen, finger or mouse.

BACKGROUND OF THE INVENTION

Computer graphic operations that are initiated by pointing devices are typically two types: drawing operations and control operations. Drawing operations describe loci for the placement of visible marks on the image, analogous to drawing on a piece of paper by making a motion with a pen in contact with the surface. Control operations are used to initiate and guide the execution of computer functions leading to modification of the visible marks. Control operations are especially important to the performance of editing functions such as erasing, moving, or changing the visual qualities (e.g. line width) of visible marks of the image.

With most user interface systems, control functions are generally instituted by giving commands to the system (e.g. keyboard command languages, menuing techniques, etc.). Giving commands can be simplified into two parts: specifying (creating or selecting) the command and issuing it, i.e., telling the system to "execute it." In a gesture based input system such as the Liveboard (trademark of Xerox Corporation), such control functions can be instituted by either a menu or a command gesture. It is noted that a gesture like other freehand data strokes entered on the touch panel is also a handrawn stroke but it is interpreted as a command designating an action for the system to perform.

With menu functions, a visible menu is either located on a specified area of a display or appears near the stylus position when desired (pop-up menu). In order to institute a simple command from a menu, the user moves to a desired item and selects it by pressing or lifting a button on the pointing device if one were present on the device or by some other means if an ordinary pen were used. If the user does not wish to commit to a control command operation, i.e., issue any item on the menu, the user can move the pointing device off of the menu before issuing the command or move the stylus to a "cancel" selection and lift the stylus from the display.

On the other hand, in order to institute a simple control command by gesture, the user would draw a gesture that represents some desired operation and then commit to this command by lifting the input device (e.g. stylus) or a button on the device (e.g. mouse). Whether issuing commands by menu or by gesture, it is important to note the distinction between selection commands and command operations in the graphical interfaces described above with respect to their location on a touch panel. With graphical interfaces, graphic images are used to represent objects in the system (i.e., files, text, processes, etc.). Commands generally consist of the selection of a graphic object and the application of an operation to the object. For example, in a system that uses menus, the pointing device is used to select an object by pointing to it, a menu is displayed "on top" of the object and the user selects an operation from the menu. In this way operations are applied to objects. Gestures work in a similar manner. The user selects an object then draws a gesture to specify an operation to be applied to the object. In many systems selection and gesture can be combined by drawing the gesture "on top" of the object.

In these graphical interfaces systems, a command may be issued via menu or gesture by direct-touch input or by indirect input. Direct-touch input for a graphic user interface occurs when the user physically touches the input device onto the display. Thus, the physical place of input (the device) is the same as the physical place of output (the display). An example of direct touch input is in the Liveboard where the Liveboard pen touches the liveboard display. When the Liveboard is simulating the whiteboard, the display pixels turn black (or whatever the "pen color" is) at the locations where the pen touches the board, much like "ink" flows from a pen. Of course it is possible for the Liveboard to blacken pixels that are not where the pen is touching, but the effect of doing so is often unnatural, even disturbing for the user.

Indirect input occurs when the input device is moved on a different surface from the display surface. One example of indirect input is a mouse which is moved over a desktop or mouse pad. Another example is the stylus used with an input tablet without a display. In the first example, the relative movements are sent to the computer which computes an effect on the display (usually the movement of a cursor). In the second example, the points of the tablet are given corresponding points on the display. These are usually called relative position and absolute position devices.

Although direct-touch is very natural for a user there are some disadvantages. Sometimes it is desirable for a system to translate the cursor's position from a point where it is naturally located, given the position of the input device. Consider for example the case of the pop-up menus. If a user points to the center region of a display, the pop-up menu appears at the cursor's location. The user then moves the input device to select an item from the menu. This works for both direct touch and indirect input. However, if a user points into a corner region on the display, the entire menu does not fit on the display.

With indirect input using a relative position device, this can be accomplished easily by placing the pop-menu towards the center of the display where it will fit and translating the cursor to be in the menu. With direct touch, it is not possible to translate the cursor, since the cursor is by definition always "under the pointing device," i.e., the lo pen tip or finger tip. Therefore, while the menu can be moved to a better location by the system, the user must physically move the input device. A similar problem exists with gestures. If there is :not enough room to draw a gesture, with indirect input, the cursor can be translated to a new position where there is enough room to draw and drawing can continue. This cannot be done with direct touch.

It would be desirable to have the same advantage as indirect input available to those direct-touch input devices.

OBJECTS AND SUMMARY OF THE INVENTION

It is an object of the present invention to overcome the disadvantages associated with direct-touch input devices described above.

The above object is achieved in accordance with the present invention by a a system which allows a user to implement pop-up menus and gestural marks on desired objects when such objects are located in a restricted area such as in a corner region of a display.

In the case of menus, the system translates the information under its position from one location where space is .limited to another location where space is essentially unlimited. In such restricted locations, the system provides a indicator or guide to direct the user to make the required movement of the input device to the unrestricted location. Such a guide consists of a visible path on the display from the current restricted location to the new location. The path guides the user into making the appropriate adjustment after which the user can proceed to make the appropriate menu selection.

In the case of gestures, the system provides a command which creates a graphic that allows gestures which are drawn at one location on the display to be applied ("redirected") to another location on the display. The graphic is used to redirect gestures in "restricted" display locations (where there is not enough room to draw the gestures) to other locations where there is sufficient room to draw the gestures.

In accordance with the present invention, a graphic editing system is provided which includes a surface and a user controllable means for contacting said surface. The system comprises means for displaying first information within a given peripheral region on said surface, first means responsive to a first user action contacting said surface at least within a given peripheral region of said surface for displaying second information at a first position in a second region of said surface different from said peripheral region, and second means responsive to a second user action contacting said surface at least at said first position for selectively moving and modifying a display of first information on said surface.

In accordance with another aspect of the invention, a graphic editing system is provided which includes a surface and user controllable means for generating information on said surface. The system comprises first means responsive to a first user action contacting said surface for generating information at on said surface that is only partially visible to said user, and second means responsive to said information being generated in said peripheral region for generating second information at a first position in a second location on said surface different from said first location that is visible to said user that represents a surrogate for said first information.

In accordance with another aspect of the invention, a graphic editing system is provided which includes a surface and user controllable means for generating a line image on said surface. The system comprises first means responsive to a first user action contacting said surface for generating a first line image at a first location on said surface, and second means responsive to a second user action subsequent said first user action for generating a second line image at a first position in a second location on said surface different from said first location that represents a surrogate for said first information.

In accordance with the invention, a method for graphic editing is provided which includes a surface and a user controllable means for contacting said surface. The method comprises the steps of displaying first information within a given peripheral region on said surface, displaying second information at a first position in a second region of said surface different from a peripheral region in response to a first user action contacting said surface at least within said peripheral region of said surface, and selectively moving and modifying a display of said first information on said surface in response to a second user action contacting said surface at least at said first position for selectively moving and modifying a display of first information on said surface.

BRIEF DESCRIPTION OF THE DRAWINGS

The invention is illustrated by way of example and not limited by the figures of the accompanying drawings in which like references denote like or corresponding parts and in which.

DESCRIPTION OF THE PREFERRED EMBODIMENT

Figure 1:
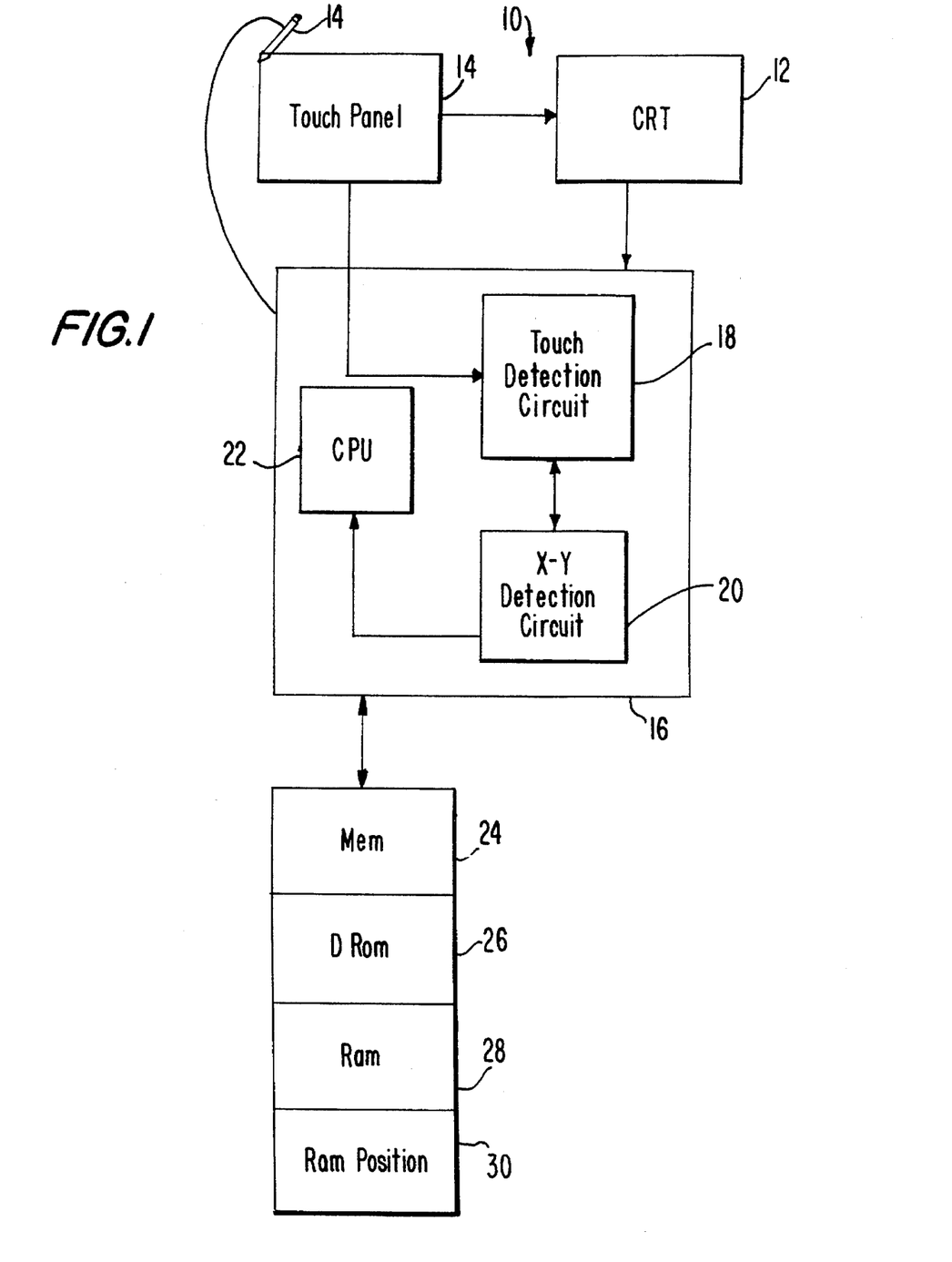
FIG. 1 is a block diagram illustrating one form of touch based input apparatus in which the system according to the present invention can be employed.

FIG. 1, illustrates is shown a block diagram of the touch based input system 10 including a CRT display 12. A transparent pressure sensitive touch panel 14 is attached onto the surface of CRT display 12. Touch panel 14 is touched by a user and the touch is detected by touch detection circuit 18. A detection signal corresponding to the position of the touched input point is output from touch detection circuit 18 in a controller 16.

The detected signal from touch detection circuit 20 is input to an X–Y detection circuit 20. X–Y detection circuit 20 processes the input signal and performs an arithmetic operation or the like. Thus, the X–Y detection circuit 20 detects the (x, y) coordinates of the input point touched on the surface of touch panel 14 and transmits such information to CPU 22. Touch panel detection circuit 18, X–Y detection circuit 20 and the CPU 22 combine to form controller 16. Controller 16 performs the control in accordance with the control program stored in program ROM 26 in memory 24. ROM section in memory 24 includes program ROM 26 in which the control program of CPU 22 is stored and pattern data area to store various kinds of character patterns or the like. RAM section 28 of memory 24 includes a RAM portion which is used as a work area of CPU 22 and a character position data area 30 to store display positions of character patterns and the like.

Figure 2:
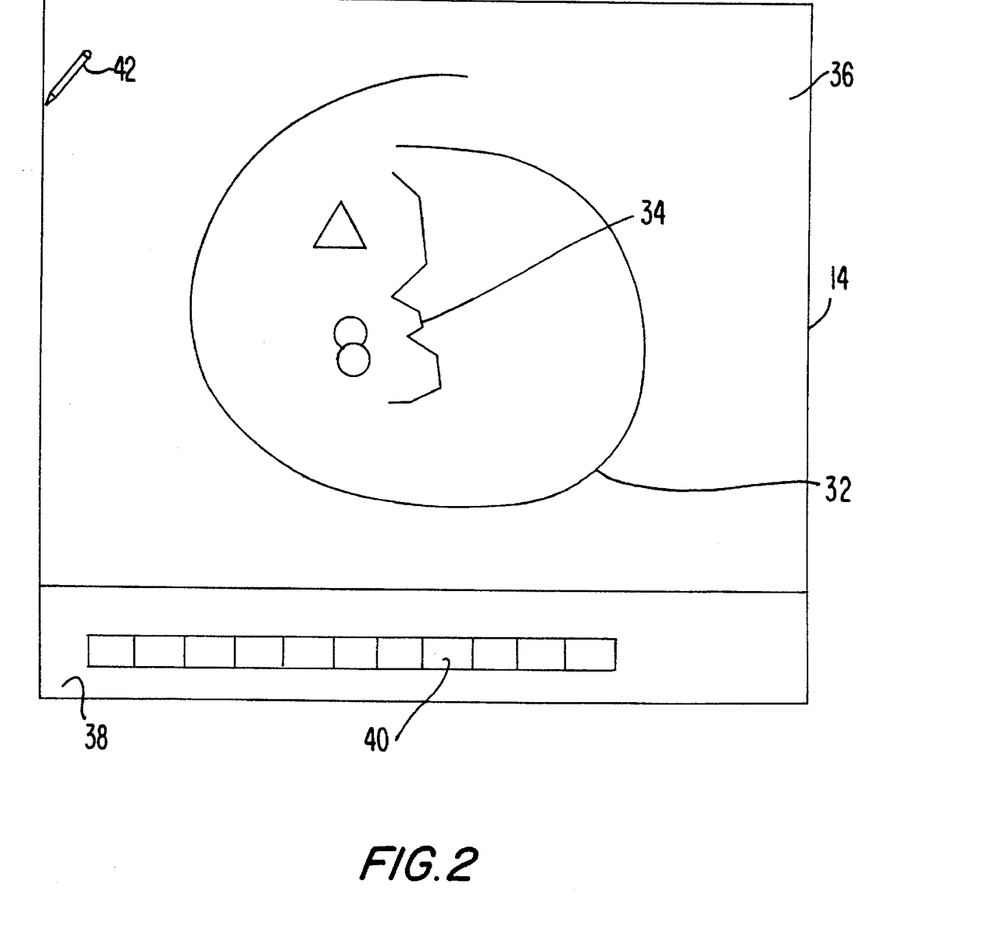
FIG. 2 is an elevational view of a display screen with a loop gesture enclosing several objects.

Specifically, in FIG. 2 touch panel 14 is an electronic input device such as an electronic sketch pad, liveboard or whiteboard which employs a working surface and may employ a plurality of accessible functions 40 as is shown. The working surface is the upper area 36 of touch panel 14 and the accessible functions 40 are positioned at the bottom area 38 of touch panel 14. These functions 40 may include new operation (draw mode), delete, move, shrink and so on. Alternatively, these functions can be accessed by a pop-up menu. These functions however are optional in designation, their principal objects being to define operations which are inherent in the operation of the system. These functions may share the some of the same functions that are represented by many designated command gestures.

A suitable user manipulable control or interacting device such as a stylus or light lo pen or the like 42 is employed to draw input symbols, select functions or draw gestures representative of specified functions. Obviously, other variants within the skill of the art may be employed.

In FIG. 2 the user has created objects 34 and has selected these objects by drawing a circle 32 around them.

Figure 3A:
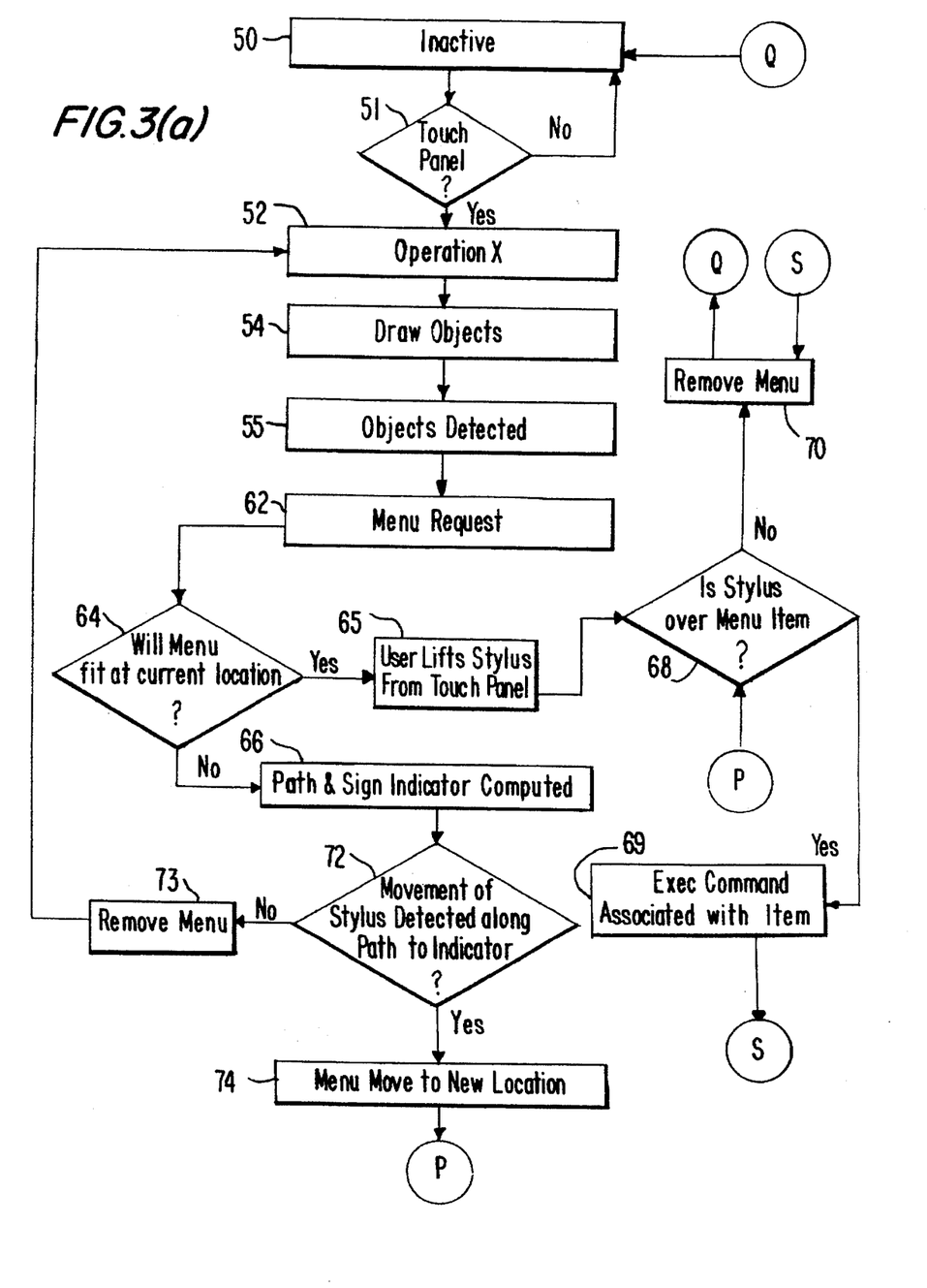
FIG. 3(a) is a flowchart showing the sequence of operations for object manipulation by menu command including the operations of the present invention.
Figure 3B:
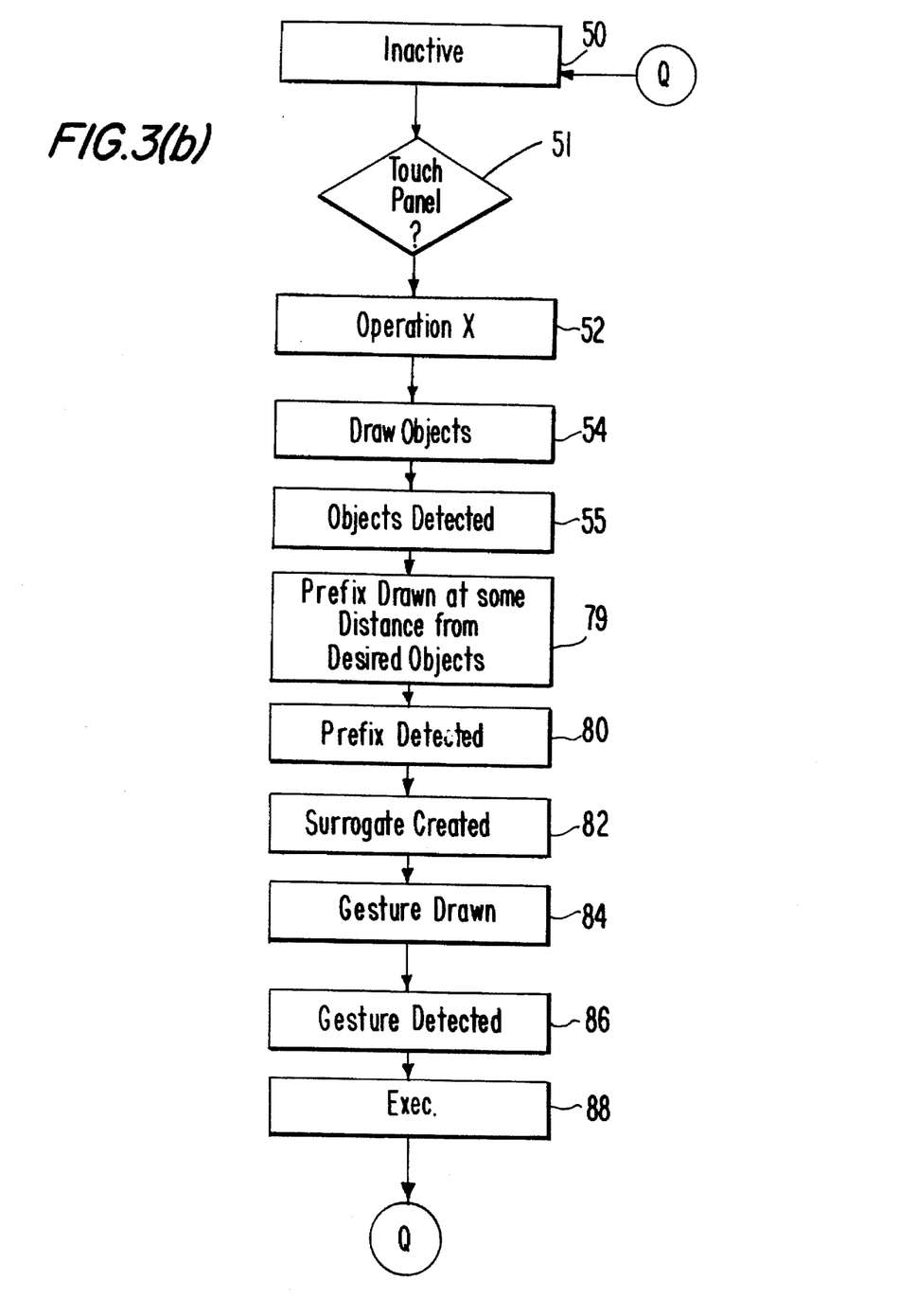
FIG. 3(b) is a flowchart showing the sequence of operations for object manipulation by command gesture including the operations of the present invention.

A drawing editing application which incorporates the present invention by making use of the following user operations is illustrated in FIGS. 3(a) and 3(b). These operations are based on the system procedures set forth in Appendix A. User actions are shown as encircled by rounded figures and computer implemented decisions and functions are shown in diamond and rectangle figures. The sequence of operations is as follows.

Referring to FIG. 3(a), as indicated by inactive block 50 touch panel 14 remains inactive until a signal is sensed from a user's action. A user has the option of touching any of the accessible functions (to print e.g. or to call up a pop-up menu) or touching the upper area of the touch panel 14 to activate it. This option is defined as selecting a new operation 52 i.e., operation x. It is noted that the touch panel 14 is by default in the DRAW mode under the control structure. Should the user desire to draw objects on touch panel 14 he/she may do so at user action FIG. 54. These objects drawn are detected at block 55 and then stored and displayed.

When the user desires to manipulate the objects drawn by performing some desired function, he/she may retrieve i.e., "call" a pop-up menu at user action FIG. 62. This menu can be a pull-down or pie type. The menu may be called, for example, by exerting pressure on the stylus, if the stylus is of the type that outputs a pressure responsive signal. At diamond 64, the system then detects whether the menu can be completely fit at the current location of the stylus. If the menu is completely displayed, the user may remove the stylus from the touch panel 14 at user action FIG. 65. At decision diamond 68 the system determines if the stylus is over a menu item before removal. If the stylus is over the an item then the command associated with the item is executed at block 69 and the system returns to inactive status. If the stylus is not over a menu item then the menu is removed at block 70 and the system returns to inactive status.

If the system detects that the menu does not fit at the current location, the user is presented with a guide display 66, i.e., a visible adjustment path on the display from the current location where only a portion of the menu can be displayed to a new location where the menu can be displayed in full. In one system version, the user may then follow the path with the stylus 42 to the displayed new location. See FIGS. 4(a)–(c). In this version, the system detects the movement along the path. In another system version, the user may remove the stylus 42 and place it at the displayed new location.

Figure 5A:
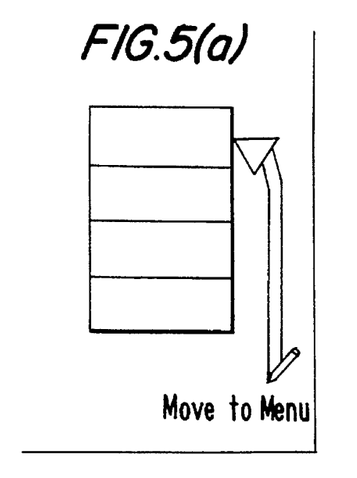
FIGS. 5(a)–5(b) illustrate the translation operations of a pop-up menu according to another embodiment of the present invention.
Figure 5B:
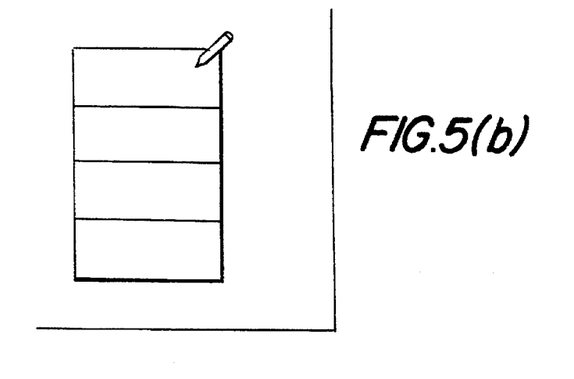

In either version, the system detects when the stylus 42 reaches the new location, and the menu is redisplayed in full at the new location 74. That is, the menu is translated or transposed to the displayed new location. In a variation, the menu may be dragged from the old stylus location as the user moves the stylus to the new location. In another embodiment as is shown in FIGS. 5(a) and 5(b), the menu pops-up at a location where it does fit, and the user is provided with an adjustment path from where the user is originally pointing to the menu. In both embodiments however, when the menu is displayed at the indicated new location, the user has the option of selecting an item for execution or removing the menu by moving the stylus away from the menu with invoking an operation. In essence, the user can act from a point onward as if the menu had popped up there in the first place. If however the user does not follow the path within some predetermined distance thereof then the system will remove the menu at at block 73 and the user may continue with the operation at user action FIG. 52.

In all embodiments, a message at the end of the path can be displayed such as "move here" to indicate where the user must move the stylus to translate the menu.

A similar technique can be applied to issuing commands by gestural marks. Gestures, like menus, don't work well when the user is too close to the edge of the display and a direct, absolute pointing device is used. FIG. 3(b) illustrates the technique using gestural commands. The description concerning the same flowchart figures shown in FIG. 3(a) is incorporated herein.

If the user desires to perform an operation on given objects by drawing a gesture, but such objects are too close to the edge of the display, then the user draws an adjustment prefix at user action FIG. 79 which has some spatial relationship with the object intended to be operated on. The adjustment prefix is a command to create a surrogate object or symbol which represents the original object, such that any gesture on the surrogate has the same effect on the original object.

Once the prefix is drawn, it is detected at block 80 and a surrogate symbol is created at block 82 at the end of the prefix. The prefix should be drawn at a location lo where the desired gesture can be drawn in full. Once the surrogate symbol is created, with the stylus 42 positioned over the surrogate symbol, the user may draw 84 any desired gesture. The gesture is then detected at block 86 and executed at block 88 to effect the desired operation on the original objects.

Figure 4A:
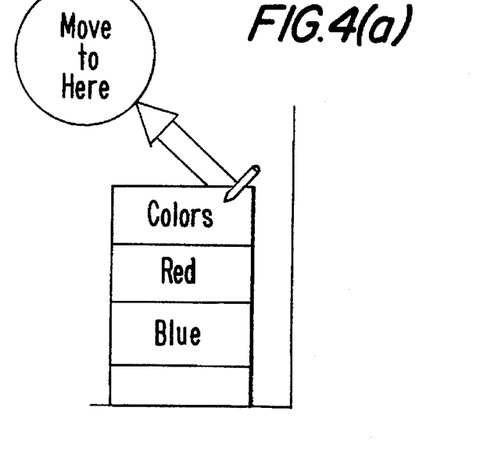
FIGS. 4(a)–(c) illustrate the translation operations of a pop-up menu according to the preferred embodiment of the present invention.
Figure 4B:
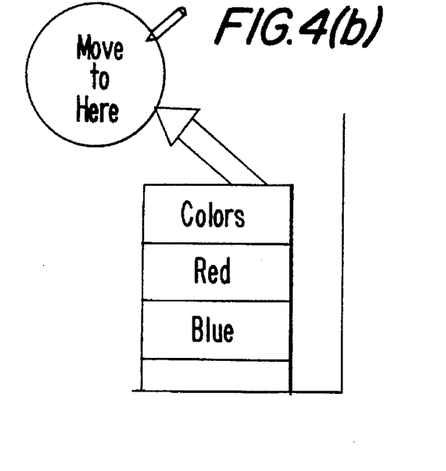
Figure 4C:
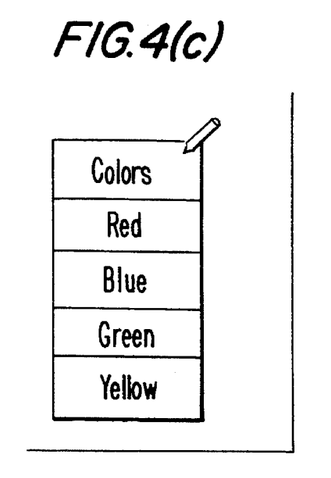

FIGS. 4(*a*)–(*c*) illustrate the preferred embodiment of the present invention as described above when used with a pop-up menu. FIG. 4(*a*) shows the menu partially displayed including the adjustment path and information message indicating where to move the stylus so that the menu will fit fully on the display. In FIG. 4(*b*) the user moves the stylus along the path to the new location. However, in another system version, the user can remove the stylus from the display and place it directly at the new location.

After the user has moved the stylus to the indicated new location, the menu is redisplayed, i.e., transposed to the new location under the stylus, and the user can proceed as normal with the use of the menu. This is shown in FIG. 4(*c*).

FIGS. 5(*a*) and 5(*b*) shows another embodiment of the present invention used with the menu as described above. In FIG. 5(*a*) when the stylus is positioned in a remote region of the display such as a corner and the user calls a menu, the menu is fully displayed at a location where it fits. In addition, an adjustment path is displayed guiding the user to move to the menu. When the stylus is moved to the menu, the adjustment path disappears and the user can proceed as normal in the use of the menu.

Figure 6A:
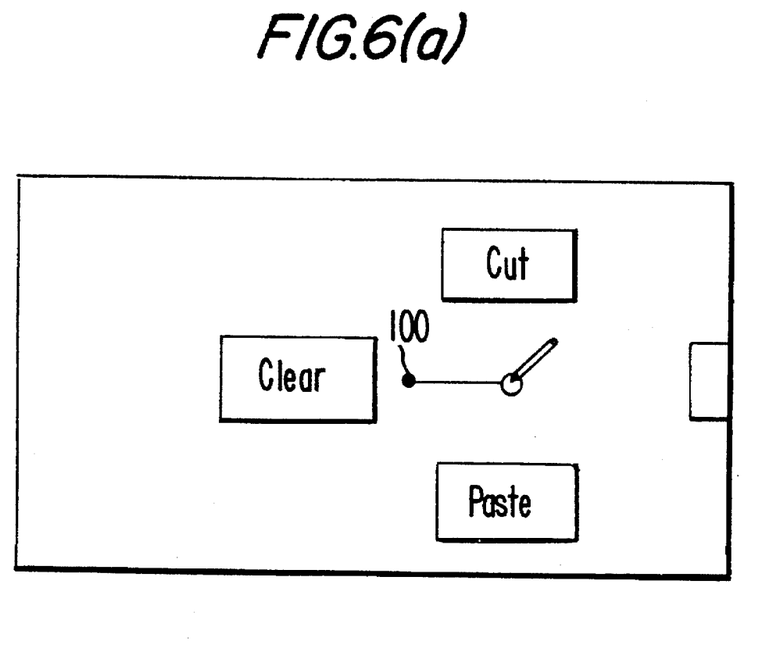
FIGS. 6(a)–6(b) illustrate the translation operations of a pop-up pie menu according to the embodiment shown in FIGS. 5(a)–5(b)
Figure 6B:
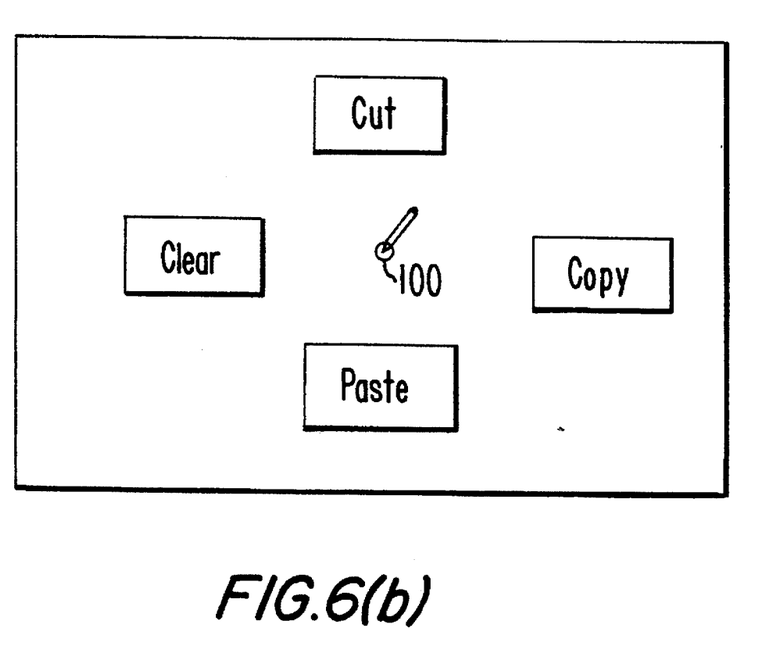

FIG. 6(*a*) and 6(*b*) show the adjustment path as implemented using a pop-up pie menu. Here the user causes the pie-menu to become visible by holding the stylus down on the touch panel 14. FIG. 6(*a*) shows the pie menu partially displayed including an adjustment path to a location, namely a black circle 100, where the menu will completely fit. FIG. 6(*b*) shows the menu redisplayed in full at circle 100 after the user moves to the new location.

FIGS. 7(*a*)–(*d*) illustrate the adjustment prefix technique for adjusting the location of a gesture on an object close to the edge of the touch panel 14. Specifically, in FIG. 7(*a*) the user desires to perform operations on the selected object 112, i.e. the handwritten words "some text" on the touch panel 14. However, such text is located at a peripheral or remote region of the touch panel 14 where a gesture cannot be completely drawn. Therefore, the user may draw a line, i.e., the user may draw an adjustment prefix 110 extending from objects 112 to a location where the gesture can fully fit. The line contains a black dot 116 at the location where the gesture can fully fit.

Figure 7A:
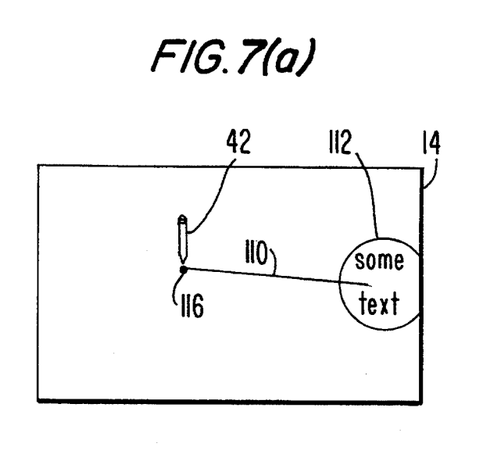
FIGS. 7(a)–7(d) illustrate the translation operations of a gesture command incorporating an adjustment prefix according to the preferred embodiment of the present invention.
Figure 7B:
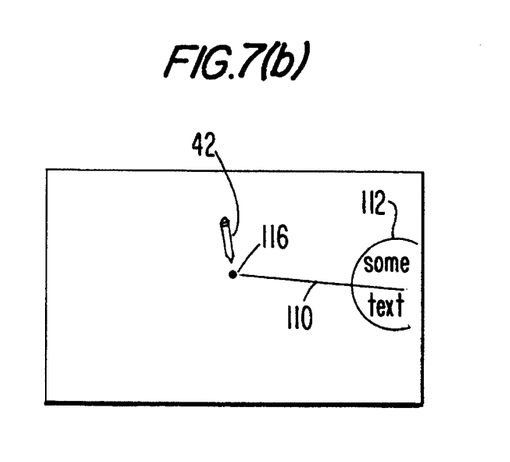

Once the adjustment prefix gesture is drawn, the system detects the prefix, i.e., the black dot 116 as a command for creating a surrogate symbol for the information located at the opposite end of the line segment. This is shown in FIG. 7(*b*).

Figure 7C:
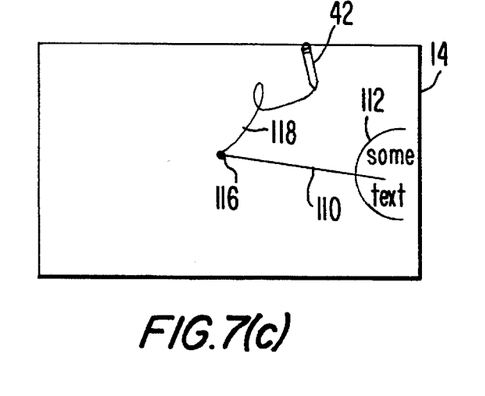
Figure 7D:
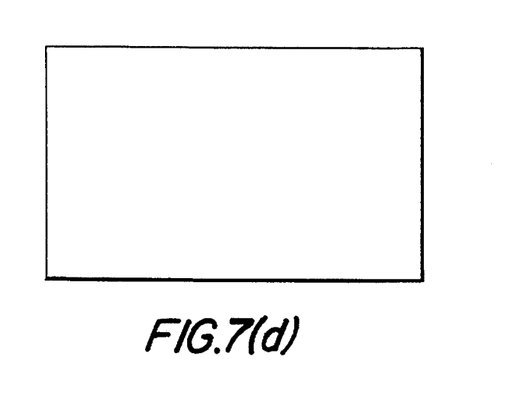

At this stage, the stylus 42 is directly over black dot 116. The user may effect operations on the text 114 by drawing gestures at black dot 116. In FIG. 7(*c*) the user applies a deletion gesture, i.e., a pigtail to the black dot 116 to the northeast. This causes the deletion command to be applied to the original text object. The result is shown in FIG. 7(*d*).

Although the invention has been described with reference to preferred embodiments, it will be apparent to one skilled in the art that variations and modifications are contemplated within the spirit and scope of the invention. The lo drawings and description of the preferred embodiments are made by way of example rather than to limit the scope of the invention, and it is intended to cover within the spirit and scope of the invention all such changes and modifications.

---

APPENDIX A

The Procedure for translating Graphial menus with direct touch input:
Repeat {
    wait for user to touch panel
    If menu is not requested
        handle non-menu command
    Else
        If menu will fit at current pen location
            display menu at current pen location
            handle selection from menu based on current
            pen location
        Else
            determine the amount to move the menu so it fits
            save the current pen location
            display the menu moved the determined amount
            compute path and sign indicator
            display the path and sign
            handle selection from menu based on saved
            location It is noted that "handle selection from menu based on location" is a subprocedure that tracks the pen tip on the screen and highlites the menu item being pointed to until the pen is lifted from the screen. It then executes the menu item last selected, if any. When the menu item is executed the system takes into account "location" (e.g., it may apply the menu item to the object at "location").

The Procedure for translating Gestural commands with direct touch input:
Repeat {
    wait for user to touch panel
    If command mode is not gesture
        handle non-gestural command
    Else
        While (pen is not lifted)
            track pen to accumulate gesture
        If gesture is the prefix symbol
            create the surrogate object according to prefix
        Else If gesture is a command in the prefix
            apply the command to the objects pointed to by
            the prefix
        Else
            the gesture is some other command, execute it.

---

We claim:

1. A graphic editing system including a surface and a user controllable means for contacting said surface, comprising:

means for displaying first information within a given peripheral region on said surface wherein said given peripheral region is only large enough to display a portion of said first information;

first means responsive to a first user action contacting said surface with said user controllable means at least within said given peripheral region of said surface for displaying second information at a first position in a second region of said surface different from said peripheral region, said second information indicating to a user how to modify, said display of said first information so that all of said first information is displayed; and     second means responsive to a second user action contacting said surface with said user controllable means at least at said first position for selectively modifying said display of said first information on said surface to display all of said first information.

2. The system according to claim 1 wherein said second means comprises means for moving said first information from said given peripheral region to said first position in said second region.

3. The system according to claim 1 wherein said second information comprises a display indicating where to contact said first position with said user controllable means for selectively moving or otherwise modifying said first information.

4. The system according to claim 1 wherein said first information is a command menu.

5. The system according to claim 1 wherein said first means includes a means responsive to said first user action for generating a first line image extending from said first information in said given peripheral region on said display.

6. The system according to claim 1 wherein said second means includes means for generating a second line image extending from said second information.

7. The system according to claim 6 wherein said second line image represents a command for creating said second information as a surrogate for said first information.

8. The system according to claim 7 wherein said second line image represents a command acting on said first information through said surrogate second information.

9. The system according to claim 7 further comprising means for executing said command.

10. The system according to claim 1 wherein said second information represents a surrogate for said first information.

11. The system according to claim 1 wherein said first information is represented by coordinates on said surface.

12. The system according to claim 11 further comprising means responsive to said first action for storing said coordinates.

13. A graphic editing system including a surface and user controllable means for generating a first gestural mark on said surface comprising:

first means responsive to a first user action of said controllable means contacting said surface for generating said first gestural mark at a first location on said surface for selecting adjacent first information; and second means responsive to a second user action of said controllable means subsequent said first user action for generating a second mark at a first position in a second location on said surface different from said first location that represents a surrogate for said first information selected by said first gestural mark.

14. The system according to claim 13 further comprising means responsive to a third user action contacting said first position with said controllable means for acting on said first information.

15. The system according to claim 14 wherein said second mark extends from said first gestural mark.

16. The system according to claim 15 wherein said second mark is a command for creating said surrogate.

17. A graphic editing system including a surface and user controllable means for generating first and second information on said surface comprising:

first means responsive to a first user action of said controllable means contacting said surface for generating said first information at a first location in a peripheral region on said surface that is only partially visible to said user;

second means for generating said second information subsequent said generation of said first information in said peripheral region, wherein said second information represents a surrogate for said first information and is generated at a first position in a second location on said surface, different from said first location, that is completely visible to said user.

18. The system according to claim 17 further including third means responsive to a third user action contacting said first position with said controllable means for translating said first information to said first position.

19. The system according to claim 17 wherein said second information comprises a first image on said display indicating where the user must contact said surface with said controllable means to translate said first information to said first position.

20. The system according to claim 19 wherein said second information comprises a second image extending from said first information to said first position for a user to follow with said user controllable means for translating said first information to said first position.

21. A method for graphic editing including a surface and a user controllable means for contacting said surface, comprising the steps of:

displaying first information within a given peripheral region on said surface which is only large enough to display a portion of said first information;

displaying second information at a first position in a second region of said surface different from said peripheral region in response to a first user action contacting said surface with said controllable means at least within said peripheral region of said surface, said second information indicating to a user how to modify said first information so that all of said first information is displayed; and selectively moving and modifying a display of said first information on said surface in response to a second user action contacting said surface with said controllable means at least at said first position.

22. A graphic editing system including a surface and a user controllable means for contacting said surface, comprising:

means for selecting first information while in a given peripheral region on said surface wherein said given peripheral region is only large enough to display a portion of said first information;

first means for displaying said first information in its entirety at a position outside of said given peripheral region; and second means for displaying a path over which said user controllable means must be dragged on said surface in order for said first information to remain displayed at said position outside of said given peripheral region.

* * * * *